United States Patent Office 3,266,930
Patented August 16, 1966

3,266,930
PROCESS OF COATING BARE METALS AND PRODUCTS THEREOF
William D. Emmons, Huntingdon Valley, Pa., and Elinor Hankins Owens, nee Elinor M. Hankins, Willingboro, N.J., assignors to Rohm & Haas Company, Philadelphia, Pa., a corporation of Delaware
No Drawing. Filed Mar. 22, 1965, Ser. No. 441,858
18 Claims. (Cl. 117—132)

This application is a continuation-in-part of our copending application Serial No. 65,588, filed October 28, 1960, now abandoned.

This invention relates to coating bare metal surfaces with hard, adherent coating compositions, i.e. without the use of a primer and to the products so produced. It is particularly concerned with coating bare metal surfaces with copolymers containing minor amounts of a monomeric ingredient which imparts vastly improved adherent properties for the bare metal surface to the resulting copolymer without significantly affecting the other physical properties of the copolymer.

Acrylic and methacrylic copolymers are highly regarded as coating materials because of their durability and high retention of gloss and color during prolonged outdoor exposure. Because of this outstanding durability, it has long been desired to use acrylic lacquers for finishing metal surfaces, such as automobile bodies and similar articles subject to outdoor exposure. However, such lacquers have poor adhesion when applied directly to metals. Consequently, a considerable amount of research effort has been directed to primer compositions which will themselves adhere to the free metal surfaces on the one side and provide a suitable base for the adherence of the hard acrylic coating on the other surface. Representative of the compositions developed for this purpose are, for example, those primer compositions described in U.S. Patent Nos. 2,782,131, 2,823,140, 2,934,509, 3,096,203, 3,136,653 and British Patent 956,516. This list is not exhaustive but is merely representative of the teachings of some of the more recent patents describing primer compositions developed to provide adequate adhesion between the bare metal surfaces and the hard coating compositions useful in protecting such surfaces.

Adherence of plastic coatings is particularly difficult to metals such as chrome plate, brass and copper, yet in many applications it is desirable to provide a protective coating for such metals. Thus, the widespread use of salt on Northern streets in wintertime makes it desirable to protect the chrome plate used in decorative trim on automobiles. While copper and its alloys, such as brass, withstand the effect of weathering, the result is the build-up of a greenish oxide film on the metal. This film is washed down by rain discoloring subjacent surfaces in the process. Moreover, since chrome plate and copper and its alloys are often used for the aesthetic appeal of such metal surfaces, any protective coating must be transparent, thus ruling out consideration of most primer compositions.

It is apparent that the requirement of adherence toward a bare metal surface is somewhat opposed to one of the basic requirements of a good coating composition, i.e. the free surface must be completely non-adherent so that dust will not adhere to the surface and so that contact of the free surface with objects such as hands or other solid bodies will neither mar nor otherwise mark the surface. Thus, what is required is controlled adherability, i.e. adherence to the substrate coupled with a completely hard and non-adherent surface for the free surface of the coating composition.

In accordance with the present invention, it has been found that copolymers suitable for use in giving hard coating compositions can be modified to have excellent adhesion to bare metal surfaces without significant alteration of their other desirable physical properties by the incorporation in the copolymer of from about 0.5 to 10%, and preferably from about 1 to 5%, by weight, based on the total weight of the copolymer, of certain monomers as hereinafter described. To be useful as a coating lacquer, the unpigmented copolymer must cure to give a film having a hardness (on the Tukon scale) of from about 8 to about 16. It has been found that films having a cured hardness greater than about 16 have poor flexibility, impact resistance and adhesion. Similarly cured films having a Tukon hardness below about 8 are easily marred, scuffed and marked.

Tukon hardness, or more properly the Knoop hardness number, KHN, is determined on a Tukon microhardness tester. The tester utilizes a pyramidal shaped diamond point of specified dimensions. In operation, a button is pressed and the instrument executes a series of automatic operations: The diamond point is impressed into the coating at a fixed rate of loading; the load, preset by the operator, is applied for a fixed length of time; and finally the point is removed from the coating. The indentation thus formed is examined with a microscope forming part of the tester. The microscope is equipped with a micrometer eyepiece. The length of the indentation is measured in terms of units on the micrometer scale and the KHN calculated.

For thin films of copolymers having a second order transition temperature above the testing temperature, i.e., whose internal stresses cannot be relieved by flow, there is apt to be a stress transfer to the substrate so that thin films appear harder than thick films of the same material. In general, a film thickness of at least about 5 mils avoids any significant error due to such stress transfer.

As is obvious, the hardness of a film will vary with the baking conditions to which the film is subjected. Thus, in one of the examples, the film had a Tukon hardness of 8.3 when baked for 30' at 300° F., but the KHN for the same material was 7.4 when baked for 30' at 180° F. In the instant application, unless otherwise specified, all hardness readings are on films baked for 30' at 300° F.

The specific monomers which impart the improved adhesion required of the copolymers used in the present invention are those acids of the general formula

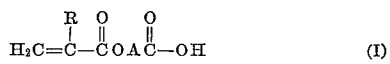

$$H_2C=\underset{R}{\overset{|}{C}}-\underset{}{\overset{O}{\overset{\|}{C}}}OA\overset{O}{\overset{\|}{C}}-OH \qquad (I)$$

wherein

R is selected from the group consisting of H and $CH_3$, and

A is an alkylene group having 1 to 3 carbon atoms.

The acids embraced by this formula are: α-acryloxyacetic acid, α-methacryloxyacetic acid, α-acryloxypropionic acid, α-methacryloxypropionic acid, β-acryloxypropionic acid, β-methacryloxypropionic acid, α-acryloxybutyric acid, α-methacryloxybutyric acid, β-acryloxybutyric acid, β-methacryloxybutyric acid, γ-acryloxybutyric acid, and γ-methacryloxybutyric acid. These acids are known and can be prepared by known processes, including those described in U.S. Patent No. 2,141,546.

The invention, therefore, contemplates as one of its simplest and preferred embodiments the incorporation in a finishing lacquer of copolymers containing 90 to 99.5% by weight of at least one hard monomer selected from the group consisting of methyl methacrylate, ethyl methacrylate, acrylonitrile, methacrylonitrile, styrene, and vinyltoluene (o, m, and/or p) with 10 to ½%, respectively, of one or more of the acids specified above. Lacquers prepared from such hard copolymers comprise the copolymer blended with one or more plasticizers so that the combination has the desired hardness, both combined with a suitable solvent. In its broader concept, however, the lacquers of the present invention comprise copolymers of ternary, quaternary, etc., character containing at least one hard monomer as defined above, ½ to 10% by weight of one or more of the acids specified above, and the balance of one or more other copolymerizable materials. These copolymerizable materials may be any monoethylenically unsaturated comonomers including α-methylstyrene, vinyl acetate, vinylidene chloride, vinyl 2-ethylhexoate, vinyl chloride, and esters of acrylic acid, methacrylic acid, maleic acid and itaconic acid with a saturated hydrocarbon group having 1 to 18 carbon atoms, such as methyl acrylate, ethyl acrylate, butyl acrylate, 2-ethylhexyl acrylate and octadecyl acrylate, butyl methacrylate, isooctyl methacrylate, hexadecyl methacrylate, monobutyl itaconate, monobutyl maleate, dibutyl itaconate, dibutyl maleate, dimethyl maleate, etc. The copolymers may also contain up to 5% by weight of hydrophilic monomers, such as acrylamide, methacrylamide, N-methylolacrylamide, N-methylolmethacrylamide, β-hydroxyethyl vinyl ether, and even other acids such as methacrylic acid, acrylic acid, maleic acid, itaconic acid, and the monoesters of the last two acids. However, it is generally preferred that the total of the acids of Formula I and the hydrophilic monomers does not exceed 10% by weight of the copolymer. When it is not desired to employ an external plasticizer to obtain proper hardness, the copolymer may be internally plasticized to any desired extent by incorporating with the hard monomer and the acid of Formula I one or more soft monomers in the proper amount. Such soft monomers include the following: ethylene, isobutylene, esters of acrylic acid with monohydric alcohols having from 1 to 18 or more carbon atoms, such as methyl alcohol, ethyl alcohol, butyl alcohol, n-octyl alcohol, t-octyl alcohol, dodecyl alcohol, hexadecyl alcohol, octadecyl alcohol, and so on or esters of methacrylic acid with alcohols having 3 to 18 carbon atoms, vinyl esters of saturated monocarboxylic acids having at least 6 carbon atoms such as vinyl 2-ethylhexoate, diesters of maleic acid and itaconic acid with saturated monohydric alcohols having 4 to 12 carbon atoms, etc. If desired, the copolymer may contain units from both an internally plasticizing comonomer of the list just mentioned and one of the comonomers mentioned in the first list above. As stated previously, when a plasticizing comonomer is included, it may be unnecessary to include an external type of plasticizer in the lacquer.

The viscosity average molecular weight of the copolymers may be in the range of 40,000 to 150,000 and is preferably between 90,000 and 130,000. By using copolymers in these ranges and especially in the latter of them, it is possible to produce sprayable lacquers of high solids, such as from about 12 to 20% by weight of non-volatile solids concentration.

The copolymers may be prepared by granular, bulk, emulsion, suspension, or solution polymerization of the several comonomers and, if desired, a portion having a preferred narrow range of molecular weight may be extracted from the products of such polymerization procedures by preferential solvent techniques in accordance with well-known practice. A preferred method of preparing the copolymers involves introducing suitable proportions of the comonomers with a solvent which may be a solvent for both the monomers and the copolymer and with a catalyst, such as one of the well-known organic peroxide catalysts, such as benzoyl peroxide, or one of the well-known azo catalysts, such as $\alpha,\alpha'$-azodiisobutyronitrile, into a reaction vessel in which the mixture is heated with continuous agitation for a period of 2 to 9 hours followed by cooling.

The lacquer may contain one or more external plasticizers to obtain the desired hardness, generally in an amount up to 50% by weight of the weight of the copolymer. Examples of plasticizers that are suitable including benzyl butyl phthalate, dibutyl phthalate, triphenyl phosphate, 2-ethylhexyl benzyl phthalate, and dicyclohexyl phthalate. Other well-known plasticizers for polymers of methyl and ethyl methacrylates which may be employed include diallyl phthalate, dibenzyl phthalate, butyl cycloexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresylphosphate, toluene ethyl sulfonamide, the di-2-ethylhexyl ester of hexamethylene diphthalate, and di(methylcyclohexyl)phthalate. The particular plasticizer and the amount thereof used are chosen in accordance with the demand for compatibility and with the requirement that the coatings have a Tukon hardness of from about 8 to 16.

Various solvents may be employed, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfuryl, petroleum naphtha, boiling in the range of about 87° to about 145° C., cyclohexane, hexane, aromatic hydrocarbon mixtures, such as "Solvesso 150," also various aliphatic, naphthenic, and aromatic naphthas. While certain of these solvents cannot be used alone because of lack of solvent power for the copolymers, they can be used in a mixture with others. Obviously, mixtures of such solvents are generally quite useful.

While, for certain purposes, a clear lacquer may be employed, it is quite general to include pigments in an amount up to 100% by weight of the polymer in the lacquer finishing compositions. Examples of suitable pigments include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth.

It will be obvious to those skilled in the organic coating art that the amount of pigment may be varied widely depending on the effect desired. The amount of pigment, by weight based on the weight of the organic film-forming material, may vary between about 2% for light, high-hiding pigments, such as carbon black, and about 100% for heavy, low-hiding pigments, such as lead chromate.

It is common practice in the coating art to prepare liquid coating compositions on a commercial basis in a highly concentrated form. In comparison with the same composition in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. The maximum degree of concentration, i.e., the maximum non-volatile solids content is limited only by the maximum consistency which can be conveniently handled by the manufacturer and the ultimate user. While concentrated lacquers having a non-volatile solids content of 75% by weight, or even higher, may be prepared, the normal concentration is usually between 30 and 60%. The minimum concentration is obviously the solids content of the ready-to-apply lacquers; but, as previously mentioned, such compositions are not usually prepared by the manufacturer because they are not adaptable to adjustment by the user.

The method of dispersing or grinding pigment in the film-forming materials is not critical provided a smooth, uniform dispersion of finely-divided pigment is produced. Examples of suitable equipment well-known in the art are ball, pebble, buhrstone, roller, and colloid mills and kneader-mixers, such as Banbury or Warner-Pfleiderer.

The concentrated lacquers may be reduced to whatever concentration is suitable for the particular manner of application. The application concentration may vary from about 5 to 30% non-volatile solids (that is, including plasticizer), depending upon the manner of application and the thickness of coating desired. For spraying, the concentration may be between 10 and 20% solids.

While the preferred lacquers used in this invention contain, as film-forming materials, only the copolymers described with, optionally, plasticizers therefor, suitable lacquers may be prepared by incorporating other compatible film-forming materials with the aforementioned ingredients. Examples of such additional film-forming materials are cellulose nitrate, other cellulose esters, alkyd resins, polyether diepoxide and polymers of the short-chain alkyl esters of acrylic and methacrylic acids, the choice being dictated by the requirement for compatibility. Obviously, it is most convenient to incorporate the additional film-forming materials in the form of solutions.

To develop adequate hardness and adhesion, particularly within a reasonable time, the films must be cured. The time and temperature selected for curing are inversely related to each other, i.e. the higher the temperature the shorter the time of baking and vice versa. The concentration of the acid monomer of Formula I and the hardness of the film are also important in determining optimum curing conditions. In general, harder films require more drastic curing conditions to develop maximum adhesion, while softer films show excellent adhesion under relatively mild curing conditions. Similarly, at the higher concentrations of the acid monomers of Formula I used in the coatings of the invention, the curing conditions are less critical, while at lower concentrations, more drastic curing is needed for maximum adhesion. Thus, the use of minor amounts of one of the acid monomers of Formula I as described herein gives the coating formulator a wider choice of compositions and curing conditions. The effects of these variables are illustrated in the examples. As is there seen, the times and temperatures normally used for baking conventional hard coatings may be used in curing the coatings used in the instant invention.

While conventional air spraying is the preferred method of applying the products of this invention, obviously other methods may be used, such as hot air spraying, steam spraying, electrostatic spraying, spraying a preheated coating composition, dipping, brushing, and roller-coating.

The copolymers of the present invention containing ½ to 10% by weight of the acid groups of Formula I may be mixed, to the extent they are compatible, with similar polymers which contains no acid groups the amounts of the polymers being such as to provide from ½ to 5% (by weight) of acid-containing units in the overall composition of the polymer blend. The preferred proportion of such acid-containing units is from about 1% to 2% of the overall weight of the polymer blend.

It is, indeed, surprising that the use of a minor amount, i.e., as little as 1% or less by weight, of one of these monomers of Formula I can so drastically improve the adherence of the resulting copolymer to a bare metal substrate. Further, the ability of these monomers to improve the adhesion of the coating seems to be peculiar to metal surfaces. Thus, while coatings containing the copolymers produced as described herein may be applied to a variety of substrates, such as wood, masonry and primed metal surfaces, no significant improvement in adhesion to such substrates has been observed by reason of the presence of the adhesion promoters used in the present invention.

In the following examples which are illustrative of the present invention, the parts, percentages, and ratios are by weight unless otherwise indicated. Adhesion was measured with a standard Arco microknife manufactured by Gardner Laboratories. Values given are calculated from microknife determinations and are relative with the higher numbers indicating better adhesion. See Official Digest of Federation of Paint and Varnish Production Clubs, January 1953.

EXAMPLE 1

A charge comprising 477.4 grams (68.2 weight percent) of methyl methacrylate, 205.1 grams (29.3 weight percent) of ethyl acrylate, 17.5 grams (2.5 weight percent) of α-methacryloxyacetic acid, and 1.75 grams (0.25% of total monomer charge) of benzoyl peroxide is added in the course of two hours to a glass reaction vessel containing 855.0 grams of toluol maintained at 107° to 109° C. by means of external heating. The mixture in the flask is stirred during the addition and subsequent reaction and maintained at 107° to 109° C. under a nitrogen atmosphere. Two, four and six hours after the polymerization has started, the reaction is recatalyzed with 0.7 gram of additional benzoyl peroxide and the temperature maintained at 107° to 109° C. throughout the entire polymerization. Continued heating for a total of eight hours completes the polymerization cycle. The reaction is then cooled and diluted with 195.0 grams of toluol. The final resin is a clear, viscous solution having a viscosity of 8 poises at approximately 40% resin solids in a toluol solvent system.

Then 200 grams rutile titanium dioxide and 200 grams of the copolymer solution are dispersed with three passes on a 3-roll mill to a fineness of 8 on North Standard gauge.

To 400 grams of the above paste are added 550 grams of the copolymer solution giving a pigment-binder ratio of 40/60 based on non-volatile content. Reduction to spraying viscosity of 15 seconds Ford #4 cup is made with a 3 to 1 blend of xylol and 2-ethoxyethyl acetate.

Cold-rolled steel panels are sprayed with the above enamel at spraying viscosity to a dry-film thickness of 1.2 to 1.4 mils. Coated panels are dried for ½ hour at 180° F. This coating gives a microknife adhesion value of 18.2 as opposed to a value of 4 to 6 for a lacquer formed from a similar copolymer containing no methacryloxyacetic acid.

EXAMPLES 2 to 4

A series of three copolymers are prepared in the manner of Example 1 using varying amounts of methacryloxypropionic acid (MOPA) with methyl methacrylate (MMA) as the hard monomer and butyl acrylate (BA) as the soft monomer in a ratio to give coatings with a Tukon hardness of about 14.

A series of three controls (designated as Examples 2C, 3C and 4C, respectively) are also prepared substituting an equimolar amount of methacrylic acid (MAA) for the MOPA (since MAA has a molecular weight approximately half that of MOPA, only about half as much is used on a weight basis).

The resin solutions so obtained are used as lacquers to form unpigmented films applied directly to cold rolled steel panels and baked. The following Table I gives the monomer ratios, the microknife adhesion values under different baking conditions, and the Tukon hardness of each film. The same values are given for a MMA/BA copolymer containing neither MAA nor MOPA.

Table I

| Ex. No. | Monomers | Weight Ratio | Microknife Adhesion | | | Tukon Hardness |
|---|---|---|---|---|---|---|
| | | | 30'—300° F. | 30'—250° F. | 60'—200° F. | |
| 2 | MMA/BA/MOPA | 76/23/1 | 25.0 | 19.4 | 5.2 | 14.6 |
| 3 | MMA/BA/MOPA | 74.6/22.9/2.5 | 25.0 | 26.0 | 7.8 | 14.0 |
| 4 | MMA/BA/MOPA | 73/22/5 | 22.0 | 28.0 | 11.5 | 13.7 |
| | MMA/BA/— | 76.5/23.5/— | 10.5 | 4.9 | <5 | 13.6 |
| 2C | MMA/BA/MAA | 76.1/23.4/0.5 | 7.5 | 5.0 | <5 | 13.7 |
| 3C | MMA/BA/MAA | 75.4/23.2/1.4 | 7.2 | 5.4 | <5 | 14.1 |
| 4C | MMA/BA/MAA | 74.4/22.9/2.7 | 7.2 | 5.1 | <5 | 14.5 |

As can be seen from an inspection of Table I, in films of this hardness, whether compared at equimolar levels (i.e., 2 vs. 2C, 3 vs. 3C and 4 vs. 4C) or at an equal weight level (3 vs. 4C) where the MAA copolymers contains twice as many free carboxylic acid groups as the MOPA copolymer, the MOPA copolymers are strinkingly superior in adhesion.

EXAMPLES 5 TO 7

Examples 2 to 4 are repeated but varying the MAA/BA ratio so as to produce films having a Tukon hardness of about 11. The following Table II gives the monomer ratios, the microknife adhesion values under different baking conditions, and the Tukon hardness of each film. The same values are given for a MMA/BA copolymer containing neither MAA nor MOPA.

than are the MOPA copolymer films. The microknife apparatus is such that it does not give reliable readings on wet films. Accordingly, the comparative adhesion is determined by an operator who wets the film for 30 minutes and then scribes the film with a sharp knife. Adhesion is rated on a scale of excellent, good, fair and poor. On this basis, all MOPA and MAA films baked at 300° F. are excellent; at 250° F. all MAA films are poor, and of the MOPA films Examples 6 and 7 are excellent and Example 5 is good; at 200° F. all MAA films are poor, Example 7 is excellent, Example 6 is good, and Example 5 is fair.

EXAMPLES 8 TO 10

Examples 2 to 4 are repeated, but using ethyl acrylate (EA) as the soft monomer and MMA as the hard mono-

Table II

| Example No. | Monomers | Weight Ratio | Microknife Adhesion | | | | Tukon Hardness |
|---|---|---|---|---|---|---|---|
| | | | 30'—300° F. | 30'—250° F. | 60'—200° F. | 16 hrs.—140° F. | |
| 5 | MMA/BA/MOPA | 65/34/1 | 26.8 | 25.6 | 19.2 | 8.6 | 10.6 |
| 6 | MMA/BA/MOPA | 64.5/33/2.5 | 26.8 | 26.0 | 21.5 | 22.0 | 10.8 |
| 7 | MMA/BA/MOPA | 63/32/5 | 26.8 | 26.0 | 26.0 | 22.5 | 11.3 |
| | MMA/BA— | 66/34/— | 7.5 | 5.2 | <5 | <5 | 10.9 |
| 5C | MMA/BA/MAA | 65.7/33.8/0.5 | 26.8 | 16.5 | 5.2 | <5 | 10.8 |
| 6C | MMA/BA/MAA | 65.1/33.5/1.4 | 26.8 | 22.5 | 6.5 | <5 | 10.9 |
| 7C | MMA/BA/MAA | 64.2/33.1/2.7 | 26.8 | 20.2 | 8.9 | <5 | 11.6 |

Whereas Table I shows the MAA copolymers to be no better in adhesion than the same copolymer with no MAA, Table II shows that in softer films MAA gives good adhesion to metal at high baking temperatures, but very poor adhesion at lower baking temperatures. The MAA copolymer films are much more water-sensitive than are the MOPA copolymer films.

mer in a ratio to produce films having a Tukon hardness of about 10. A commercial acrylic lacquer advertised as having good adhesion to metal is used as the control. The following Table III gives the monomer ratios, the microknife adhesion values under different baking conditions, and the Tukon hardness of each film.

Table III

| Example No. | Monomers | Weight Ratio | Microknife Adhesion | | | | Tukon Hardness |
|---|---|---|---|---|---|---|---|
| | | | 30'—300° F. | 30'—250° F. | 60'—200° F. | 16 hrs.—140° F. | |
| 8 | MMA/EA/MOPA | 54/45/1 | 26.8 | 25.6 | 19.2 | 20.0 | 9.3 |
| 9 | MMA/EA/MOPA | 53.6/43.9/2.5 | 26.8 | 26.0 | 20.5 | 22.5 | 9.8 |
| 10 | MMA/EA/MOPA | 52/43/5 | 26.8 | 26.0 | 26.0 | 22.5 | 10.2 |
| Control | | | 26.8 | 17.3 | 5.6 | <5 | 8.8 |

EXAMPLES 11 TO 17

Examples 2 to 4 are repeated using either EA or lauryl methacrylate (LMA) as the soft monomer and MMA as the hard monomer except in Example 11 where a mixture of MMA and styrene (S) is used as the hard monomer and BA as the soft monomer. The following Table IV gives the monomer ratios, the microknife adhesion values under different baking conditions, and the Tukon hardness of each film.

Table IV

| Example No. | Monomers | Weight Ratio | Microknife Adhesion | | | | Tukon Hardness |
|---|---|---|---|---|---|---|---|
| | | | 30'—300° F. | 30'—250° F. | 60'—200° F. | 16 hrs.—140° F. | |
| 11 | MMA/S/BA/MOPA | 37.3/37.3/22.9/2.5 | 20.0 | 24.0 | 20.0 | 22.5 | 13.7 |
| 12 | MMA/EA/MOPA | 69/30/1 | 22.2 | 10.8 | 5.2 | 5.6 | 14.0 |
| 13 | MMA/EA/MOPA | 67/28/5 | 25.0 | 28.0 | 7.8 | 23.5 | 14.0 |
| 14 | MMA/LMA/MOPA | 67/30.5/2.5 | 28.0 | 27.0 | 25.0 | 7.5 | 10.0 |
| 15 | MMA/LMA/MOPA | 61/34/5 | 27.0 | 29.0 | 26.0 | 14.0 | 8.7 |
| 16 | MMA/LMA/MOPA | 76/21.5/2.5 | 29.5 | 28.5 | 5.6 | <5 | 12.9 |
| 17 | MMA/LMA/MOPA | 70.5/24.5/5 | 30.0 | 30.0 | 9.4 | <5 | 12.5 |

EXAMPLES 18 TO 20

A series of three copolymers are prepared as in Examples 2 to 4 each containing 98 parts MMA with Example 18 containing 2 parts of methacryloxyacetic acid (MOAA), Example 19 containing 2 parts of MAA, and Example 20 containing 2 parts of methacryloxy methyl acetate (i.e. the methyl ester of MOAA). The resin-toluol solutions are then blended with a higher alkyl (i.e. about octyl) benzyl phthalate obtained under the trademark Santicizer 262 to give a resins solids/plasticizer ratio of 70/30 coated directly on cold rolled steel panels, and baked to give films having a Tukon hardness of about 8.4. The following Table V gives the microknife adhesion of the films for different bakes:

Table V

| Example No. | Microknife Adhesion | | |
|---|---|---|---|
| | 30'—300° F. | 30'—250° F. | 30'—180° F. |
| 18 | 28.3 | 29.4 | 29.4 |
| 19 | 24.9 | 24.2 | 10.0 |
| 20 | 8.3 | 4.5 | 2.7 |

EXAMPLES 21 AND 22

Two copolymers are prepared as in Examples 2 to 4 using 37.74 parts MMA and 59.76 parts butyl methacrylate with 2.50 parts MAA for Example 21 and 2.50 parts MOPA for Example 22. Clear films are cast on cold rolled steel and baked. The following Table VI gives the Tukon hardness of the films, their adhesion at different bakes, and the flexibility of the films baked 30' at 300° F. when bent around both ¼" and ⅛" mandrels.

Table VI

| Example No. | Tukon | 30'—300° F. | 30'—250° F. | 60'—200° F. | Flexibility | |
|---|---|---|---|---|---|---|
| | | | | | ¼" | ⅛" |
| 21 | 15.0 | 20.8 | 7.0 | <5 | Delaminates. Light cracks | Delaminates. Light-medium cracks. |
| 22 | 15.2 | 23.4 | 20.5 | 19.4 | | |

Films are also cast on aluminum panels and baked at 300° F. and 250° F. for 30' each. The comparative adhesion of the films is then determined as described in Examples 5 to 7 using the excellent, good, fair, poor-scale. On this basis, the MAA films are poor both wet and dry at both bakes; the MOPA films are excellent dry for both bakes and are excellent to good (i.e., half-way between) wet for both bakes.

EXAMPLES 23 TO 26

A copolymer of 68.2 parts MMA, 29.3 parts EA and 2.5 parts MOPA is prepared as in Examples 2 to 4. Clear films having a Tukon hardness of about 14 are cast on cold-rolled steel (Example 23), aluminum (Example 24), chrome plate (Example 25) and polished brass (Example 26) and baked. The following Table VII sets forth the comparative adhesion of the films determined as described in Examples 5 to 7.

Table VIII

| Example No. | 30'—300° F. | | 30'—250° F. | | 60'—200° F. | |
|---|---|---|---|---|---|---|
| | Dry | Wet | Dry | Wet | Dry | Wet |
| 23 | E | E | E | E | E | G |
| 24 | E | E | E | E | Not tested | |
| 25 | E-G | E-G | G | G | G | P |
| 26 | E | E | E | F | G | P |

What is claimed is:

1. A metal article having a hard, adherent coating with a KHN of from about 8 to 16 in direct adherent relation to said metal, said coating comprising a copolymer of monoethylenically unsaturated monomers at least one monomer being selected from the group consisting of methyl methacrylate, ethyl methacrylate, acrylonitrile, methacrylonitrile, styrene and vinyl toluene, and about ½ to 10% by weight of at least one acid of the formula

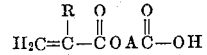

wherein
R is selected from the group consisting of H and methyl, and
A is an alkylene group having 1 to 3 carbon atoms.

2. The metal article according to claim 1 wherein said acid constitutes from 1 to 5% weight of the copolymer.

3. The metal article according to claim 1 wherein said acid is methacryloxypropionic acid.

4. A metal article having a hard adherent coating in direct adherent relation to said metal, said coating comprising
(A) a copolymer consisting of at least one monomer selected from the group consisting of methyl methacrylate, ethyl methacrylate, acrylonitrile, methacrylonitrile, styrene and vinyl toluene, and about ½ to 10% by weight of at least one acid of the formula

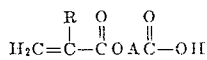

wherein R is selected from the group consisting of H and methyl, and A is an alkylene group having 1 to 3 carbon atoms, and
(B) a plasticizer for said copolymer in an amount that the coating has a KHN of from about 8 to 16.

5. A metal article having a hard adherent coating in direct adherent relation to said metal, said coating comprising
(A) a copolymer of methyl methacrylate and about 1 to 5% by weight of methacryloxypropionic acid, and
(B) a plasticizer for said copolymer in an amount sufficient that said coating has a KHN of from about 8 to 16.

6. A metal article having a hard adherent coating in direct adherent relation to said metal, said coating comprising a copolymer of monoethylenically unsaturated monomers selected from the group consisting of
(A) at least one hard monomer selected from the group consisting of methyl methacrylate, ethyl methacrylate, acrylonitrile, methacrylonitrile, styrene and vinyl toluene,
(B) at least one soft monomer in an amount sufficient that the coating prepared from said copolymer has a KHN of from about 8 to 16 and
(C) about ½ to 10% by weight of at least one acid of the formula

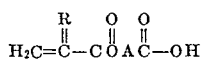

wherein R is selected from the group consisting of H and methyl, and A is an alkylene group having 1 to 3 carbon atoms.

7. The metal article according to claim 6 wherein said acid constitutes from 1 to 5% by weight of said copolymer.

8. The metal article according to claim 6 wherein said acid is methacryloxypropionic acid.

9. A metal article having a hard adherent coating in direct adherent relation to said metal, said coating comprising a copolymer of monoethylenically unsaturated monomers consisting of
(A) at least one hard monomer selected from the group consisting of methyl methacrylate, ethyl methacrylate, acrylonitrile, methacrylonitrile, styrene and vinyl toluene,
(B) at least one soft monomer in an amount sufficient that the coating prepared from said copolymer has a KHN of from about 8 to 16,
(C) about 1 to 5% by weight of at least one acid of the formula

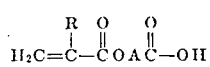

wherein R is selected from the group consisting of H and methyl, and A is an alkylene group having 1 to 3 carbon atoms, and
(D) from about 1 to 5% by weight of at least one hydrophilic monomer selected from the group consisting of acrylamide, methacrylamide, N-methylolacrylamide, N-methylolmethacrylamide, β-hydroxyethyl vinyl ether, methacrylic acid, acrylic acid, maleic acid, itaconic acid, and the monoesters of maleic and itaconic acids with lower alkyl alcohols.

10. The process of providing metal articles with a hard, adherent coating which comprises applying directly to said metal a film of an organic solvent solution of a copolymer of monoethylenically unsaturated monomers at least one monomer being selected from the group consisting of methyl methacrylate, ethyl methacrylate, acrylonitrile, methacrylonitrile, styrene and vinyl toluene, and about ½ to 10% by weight of an acid of the formula

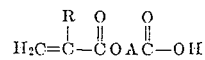

wherein
R is selected from the group consisting of H and methyl, and
A is an alkylene group having 1 to 3 carbon atoms, and curing said film to provide a coating with a KHN of from about 8 to 16 adhering directly to the metal surface.

11. The process according to claim 10 wherein said acid constitutes from 1 to 5% by weight of the copolymer.

12. The process according to claim 10 wherein said acid is methacryloxypropionic acid.

13. The process of providing metal articles with a hard adherent coating which comprises applying directly to said metal a film of an organic solvent solution of
(A) a copolymer consisting of at least one monomer selected from the group consisting of methyl methacrylate, ethyl methacrylate, acrylonitrile, methacrylonitrile, styrene and vinyl toluene, and about ½ to 10% by weight of at least one acid of the formula

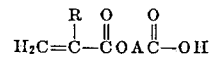

wherein R is selected from the group consisting of H and methyl, and A is an alkylene group having 1 to 3 carbon atoms, and
(B) a plasticizer for said copolymer in an amount that the coating has a KHN of from about 8 to 16, and curing said film to provide a coating adhering directly to the metal surface.

14. The process of providing metal articles with a hard adherent metal coating which comprises applying directly to said metal a film of an organic solvent solution of
(A) a copolymer of methyl methacrylate and about 1 to 5% by weight of methacryloxypropionic acid, and
(B) a plasticizer for said copolymer in an amount sufficient that said coating has a KHN of from about 8 to 16,
and curing said film to provide a coating adhering directly to the metal surface.

15. The process of providing metal articles with a hard adherent coating which comprises applying directly to said metal a film of an organic solvent solution of a copolymer of monoethylenically unsaturated monomers selected from the group consisting of
(A) at least one hard monomer selected from the group consisting of methyl methacrylate, ethyl methacrylate, acrylonitrile, methacrylonitrile, styrene and vinyl toluene,
(B) at least one soft monomer in an amount sufficient that the coating prepared from said copolymer has a KHN of from about 8 to 16 and
(C) about ½ to 10% by weight of at least one acid of the formula

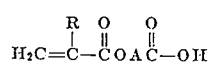

wherein R is selected from the group consisting of H and methyl, and A is an alkylene group having 1 to 3 carbon atoms,
and curing said film to provide a coating adhering directly to the metal surface.

16. The process according to claim 15 wherein said acid constitutes from 1 to 5% by weight of said copolymer.

17. The process according to claim 15 wherein said acid is methacryloxypropionic acid.

18. The process of providing metal articles with a hard adherent coating which comprises applying directly to said metal a film of an organic solvent solution of a copolymer of monoethylenically unsaturated monomers consisting of
(A) at least one hard monomer selected from the group consisting of methyl methacrylate, ethyl methacrylate, acrylonitrile, methacrylonitrile, styrene and vinyl toluene,
(B) at least one soft monomer in an amount sufficient that the coating prepared from said copolymer has a KHN of from about 8 to 16,
(C) about 1 to 5% by weight of at least one acid of the formula

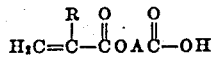

wherein R is selected from the group consisting of H and methyl, and A is an alkylene group having 1 to 3 carbon atoms, and
(D) from about 1 to 5% by weight of at least one hydrophilic monomer selected from the group consisting of acrylamide, methacrylamide, N-methylolacrylamide, N-methylolmethacrylamide, β-hydroxyethyl vinyl ether, methacrylic acid, acrylic acid, maleic acid, itaconic acid, and the monoesters of maleic and itaconic acids with lower alkyl alcohols, and curing said film to provide a coating adhering directly to the metal surface.

References Cited by the Examiner
UNITED STATES PATENTS

| | | |
|---|---|---|
| 2,141,546 | 12/1938 | Strain. |
| 2,726,230 | 12/1955 | Carlson. |
| 2,782,131 | 2/1957 | Johnson. |
| 3,060,148 | 10/1962 | Evans. |

MURRAY KATZ, *Primary Examiner.*

RICHARD D. NEVIUS, *Examiner.*

R. S. KENDALL, *Assistant Examiner.*